July 26, 1932.  D. J. WATSON  1,869,124
DEVICE FOR BURNING COMMINUTED FUEL DURING THE WATER
SMOKING PERIOD OF THE FIRING OF CLAY PRODUCTS
Filed May 29, 1929  2 Sheets-Sheet 1

Inventor
Donald J. Watson
By M. Talbert Dick
Attorney

Inventor
Donald J. Watson
By M. Talbert Dick
Attorney

Patented July 26, 1932

1,869,124

UNITED STATES PATENT OFFICE

DONALD J. WATSON, OF SIOUX CITY, IOWA, ASSIGNOR TO IOWA STATE COLLEGE OF AGRICULTURAL AND MECHANICAL ARTS, OF AMES, IOWA, A CORPORATION OF IOWA

DEVICE FOR BURNING COMMINUTED FUEL DURING THE WATER SMOKING PERIOD OF THE FIRING OF CLAY PRODUCTS

Application filed May 29, 1929. Serial No. 366,886.

The principal object of this invention is to provide a device for the successful burning of comminuted fuel in clay products kiln furnaces during the heating up or "water smoking" period of firing the ceramic ware in the kiln.

A further object of this invention is to provide a means for regulating the temperature inside a pulverized coal heated kiln at all times, and regardless of atmospheric conditions and temperatures outside the kiln.

A still further object of my invention is to provide a device for the burning of powdered or finely granulated fuel that permits the employment of a "low flame" without danger of the same going out.

A still further object of this invention is to provide a device for the successful burning of comminuted coal that may be easily installed on kilns now in use.

A still further object of my invention is to provide a device for burning pulverized fuel in clay products kiln furnaces that is economical in manufacture, durable in use, and refined in appearance.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawings, in which:

The heating up or "water smoking" period in the burning of clay products in kilns is recognized in the ceramic industry as one of the most important stages in the successfully burning of the ware. If the temperature increases too rapidly, the ware will have a tendency to burst or "slab" and on the other hand, if the temperature is too low, moisture is liable to form on the surface of the clay products and a scumming or discoloring of the ware will result. I have overcome these difficulties by the use of powdered fuel and novel means for burning and regulating the same.

Figures 1, 2:
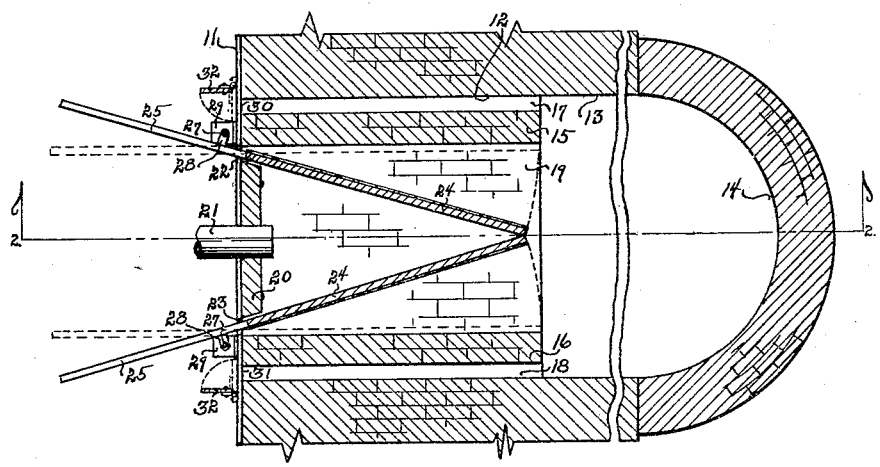
Fig. 1 is a top plan sectional view of my complete invention ready for use.
Fig. 2 is a side sectional view of the invention installed in a fire-box and is taken on line 2—2 of Fig. 1.
Figure 3:
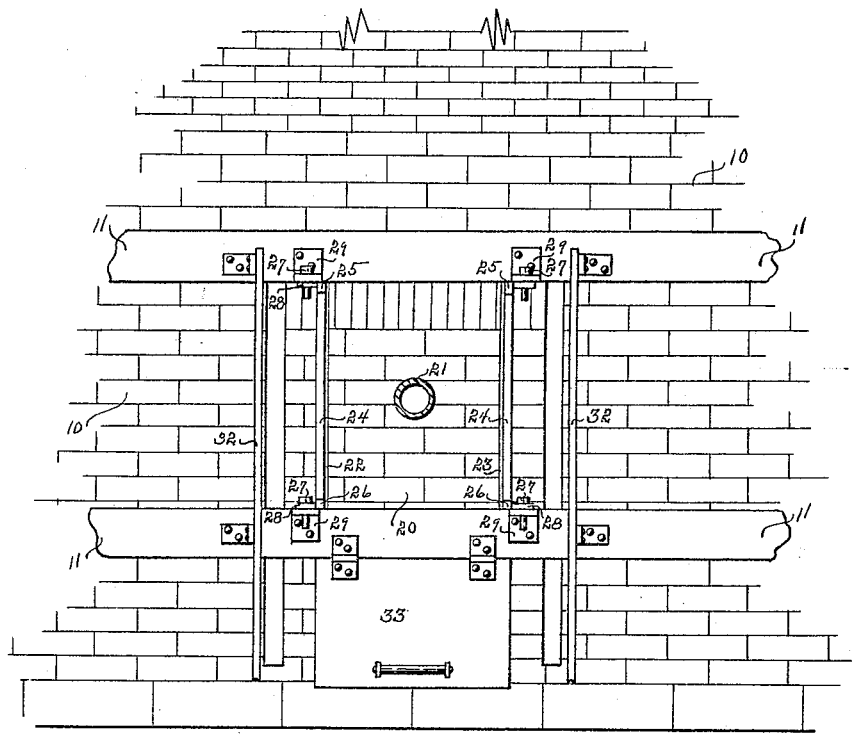
Fig. 3 is a front view of the fire-box and portion of a kiln or the like showing my invention in practical operation.
Figure 4:
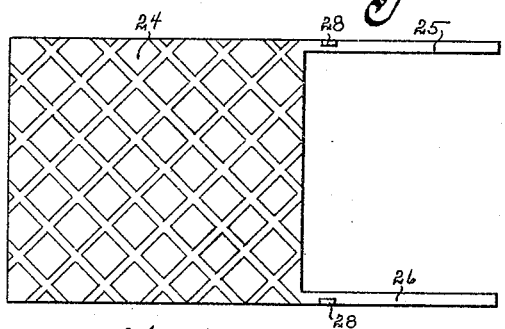
Fig. 4 is a side elevation of one of the flame restricting plates.
Figure 5:
Fig. 5 is a top plan of one of the flame restricting plates and more fully illustrates its construction.

I have used the numeral 10 to designate the side wall of a kiln or the like, having the usual kiln bands 11. Inside of this wall is the usual air duct 12 communicating with the mixing chamber 13. The numeral 14 designates a hot air bag communicating with the mixing chamber as shown in Fig. 1, and Fig. 2. The heat entering the bag 14 passes into the kiln and heats and burns the clay products therein, to be treated. The numerals 15 and 16 designate vertical parallel walls extending downwardly from the ceiling of the fire-box and to points approximately one-third of the height of the fire-box from the bottom thereof. These fire-box walls are parallel to, but do not touch the two side walls of the kiln respectively, thereby providing the air passage ways 17 and 18 as shown in Fig. 1. The numeral 19 designates a floor member connecting the two walls 15 and 16 together at their lower edges. The numeral 20 designates a vertical insulating wall between the floor and fire-box ceiling and is built rigidly in the front of the fire-box as shown by the drawings. Extending through the wall 20 is the powdered fuel inlet pipe 21 terminating at a point between the two walls 15 and 16. This pipe is designed to lead to a suitable powdered fuel supply and any well known means for forcing the same, mixed with air, through the pipe and into the space between the two walls 15 and 16 may be used. In the side of the walls of the kiln, on each side of the pipe 21 and communicating with the space between the two walls 15 and 16 are the two vertical slots 22 and 23. Capable of being inserted in these two slots are the two flame restricting plates 24, each having two handle members 25 and 26 as shown in the drawings. After being inserted in the slots, the plates may be hingedly secured to the kiln bands by headed pins 27, passing through lugs 28 on the handle members and brackets 29 secured by suitable means to the kiln bands.

By this arrangement when the handle members of the plates are moved manually toward or away from each other as shown in dotted lines in Fig. 1, the forward ends of the plates will be moved away or toward each other, thereby inclosing the flame from the pipe 21 or adjustably restricting its outlet between the two flame restricting plates. The numerals 30 and 31 designate two vertical openings at the outer sides of the walls 15 and 16 and communicating with the two air passage ways 17 and 18, respectively. Hingedly secured to the kiln bands and adjacent to each of the openings 30 and 31 is a vane 32, capable of closing or restricting the opening which is adjacent to it. By this arrangement the amount of air entering the kiln furnace through the openings 30 and 31 may be easily regulated.

The practical operation of the invention is as follows:

The plates 24 are first inserted in their respective openings and hingedly secured to the kiln bands as shown in the drawings. The forward ends of these plates should be together or in close proximity to each other and the powdered fuel or air passing through the pipe 21 ignited by any suitable means. As soon as the powdered fuel held in suspension is ignited the heat from the same will pass into the bag 14 and start the heating of the clay in the clay products chamber of the kiln. By such a construction the plates 24 will become very hot and will keep the powdered fuel alight, thereby allowing the powdered fuel to burn on a very low flame. The distance at which these plates are to be placed from each other by the swinging of the same will depend much upon the size of the flame employed and the nature and condition of the powdered coal.

If the forward ends of the plates are considerable distance from each other, the heat passing directly into the bag 14 will be quite great. If a very "low flame" is desired, very little powdered fuel should be allowed to pass through the pipe 21, and the forward ends of the plates should be close together. These plates may be ribbed on their outer faces for strength and to prevent warping. By adjusting the vanes 32, the temperature of the hot air passing through the kiln may be regulated, thus affording a second adjustable means for obtaining the desired heat, as well as humidity, inside the clay products chamber of the kiln. The cold air passing through the passage ways 17 and 18 mixes with the hot gases and makes proper combustion.

After the "water smoking" period has been completed and the fire-box is brought to a glowing condition, the two plates 24 are removed after withdrawing the pins 27, and the fire-box is then bricked up with loose fire brick and the kiln heated in the usual manner. At such a stage my invention ceased to be of further use in the burning of the particular clay ware inside the clay products chamber of the kiln.

The complete device is very easily and cheaply installed on new or old type kiln furnaces and although I have described the invention in use in connection with kiln furnaces, it may be used to advantage in any firebox where powdered fuel is being burned and a "low flame" is desirable.

If it is desired to further enclose and restrict the flame from the pipe 21, the pins 27 may be removed and the plates slid backwardly in the slots 22 and 23, thereby bringing the forward ends of the plates closer to the orifice of the pipe 21.

The numeral 33 designates a hinged door communicating with the air duct 12.

Some changes may be made in the construction and arrangement of my improved device for burning comminuted fuel during the water smoking period of the firing of clay products, without departing from the real spirit and purpose of my invention and it is my intention to cover by my claims any modified forms of structure or use of mechanical equivalents which may be reasonably included within their scope.

I claim:

1. In a device of the class described, a firebox having an opening, a closing member for closing said opening, two vertical walls extending into said fire-box and spaced apart from the two sides of said fire-box, respectively, air passageways in said closing member communicating with the outside atmosphere and the space between said walls and said fire-box, respectively, vanes hinged on said closing member for closing or restricting said passageways, two vertical slots in said closing member, plate members extending through said slots capable of swinging movement between said two walls, a handle member on each of said plates to facilitate the movement of the same, and a fuel inlet pipe extending through said closing member and terminating between said two plates.

2. In a device of the class described, a firebox, a fuel inlet pipe extending into said firebox, a plate member hingedly mounted at each side of said inlet pipe, respectively for engaging two sides of the fuel from said pipe after it has been ignited for restricting the spread of the same, and a handle member secured to each of said plates for manually swinging the same to various positions relative to the flame from the said fuel inlet pipe.

3. In a device of the class described, a firebox having an opening, a member for closing said opening, two spaced apart plates hinged to said closing member and capable of swinging movement toward or away from each other in said fire-box, and a fuel inlet pipe extending through said closing member and terminating between said two plates; said designated parts so arranged that the bottom and top of said fire-box, the closing member and the two plates may completely embrace ignited fuel in front of said inlet pipe.

4. In a device of the class described, a primary fire box, a secondary combustion chamber communicating with the inside of said fire box, a fuel inlet pipe terminating inside said primary fire box, and a plate member hingedly mounted at each side of said inlet pipe respectively, capable of being moved for engaging the two sides of the fuel from said pipe after it has been ignited for adjustably restricting the spread of the same.

DONALD J. WATSON.